US012752522B2

(12) United States Patent
Lee

(10) Patent No.: US 12,752,522 B2
(45) Date of Patent: Oct. 6, 2026

(54) TRANSPARENT LAMINATE FOR RADIATIVE COOLING AND RADIATIVE COOLING MATERIAL INCLUDING THE SAME

(71) Applicants: HYUNDAI MOTOR COMPANY, Seoul (KR); KIA CORPORATION, Seoul (KR)

(72) Inventor: Min Jae Lee, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 342 days.

(21) Appl. No.: 18/137,078

(22) Filed: Apr. 20, 2023

(65) Prior Publication Data

US 2024/0253338 A1 Aug. 1, 2024

(30) Foreign Application Priority Data

Feb. 1, 2023 (KR) ........................ 10-2023-0013748
Feb. 28, 2023 (KR) ........................ 10-2023-0026769

(51) Int. Cl.
*B32B 27/36* (2006.01)
*B32B 7/12* (2006.01)
*B32B 27/30* (2006.01)

(52) U.S. Cl.
CPC ................ *B32B 27/36* (2013.01); *B32B 7/12* (2013.01); *B32B 27/30* (2013.01);
(Continued)

(58) Field of Classification Search
CPC .......................... B32B 27/36–365; B32B 7/12
See application file for complete search history.

(56) References Cited

U.S. PATENT DOCUMENTS 5,360,659 A * 11/1994 Arends ............. B32B 17/10018 359/359
2010/0177380 A1* 7/2010 Nagahama ............ B32B 27/308 359/359

(Continued)

FOREIGN PATENT DOCUMENTS

KR 10-2154072 B1 9/2020
KR 10-2225794 B1 3/2021

(Continued)

OTHER PUBLICATIONS

Lee, K. W., et al., "Visibly Clear Radiative Cooling Metamaterials for Enhanced Thermal Management in Solar Cells and Windows." Adv Func Mater 32(1), 2021.

(Continued)

*Primary Examiner* — Blaine Copenheaver
(74) *Attorney, Agent, or Firm* — MCDONNELL BOEHNEN HULBERT & BERGHOFF LLP

(57) ABSTRACT

A transparent laminate for radiative cooling comprises a first near-infrared reflective layer including a first layer containing a first polymer and a second layer containing a second polymer stacked alternately, where the first near-infrared reflective layer reflects a near-infrared ray with a wavelength in a range from 740 to 1,400 nm, a second near-infrared reflective layer formed on the first near-infrared reflective layer and reflecting a near-infrared ray with a wavelength in a range from 1,500 to 2,000 nm, and an infrared emissive layer formed on the second near-infrared reflective layer and containing polycarbonate, and a radiative cooling material including the same.

14 Claims, 2 Drawing Sheets

(52) U.S. Cl.
CPC ..... *B32B 2250/42* (2013.01); *B32B 2307/302* (2013.01); *B32B 2307/412* (2013.01); *B32B 2307/416* (2013.01); *B32B 2307/7376* (2023.05); *B32B 2419/00* (2013.01); *B32B 2605/00* (2013.01)

(56) References Cited

U.S. PATENT DOCUMENTS

| | | | | |
|---|---|---|---|---|
| 2014/0127485 A1* | 5/2014 | Uto | G02B 5/282 428/212 |
| 2015/0064428 A1* | 3/2015 | Matsuo | B32B 7/023 428/480 |
| 2019/0111659 A1* | 4/2019 | Hatazawa | B32B 27/34 |
| 2022/0049910 A1 | 2/2022 | Lee et al. | |

FOREIGN PATENT DOCUMENTS

| | | | | |
|---|---|---|---|---|
| KR | 2022-0071613 A | 5/2022 | |
| WO | WO-2009016563 A1 * | 2/2009 | F21V 7/28 |
| WO | 2021/100997 A1 | 5/2021 | |

OTHER PUBLICATIONS

Zhou, Z., et al., "Transparent Polymer Coatings for Energy-Efficient Daytime Window Cooling." Cell Reports Physical Science 1(11), 2020.

Kim, M., et al., "Visibly Transparent Radiative Cooler under Direct Sunlight." Adv Opti Mater 9(13), 2021.

* cited by examiner

TRANSPARENT LAMINATE FOR RADIATIVE COOLING AND RADIATIVE COOLING MATERIAL INCLUDING THE SAME

CROSS REFERENCE TO RELATED APPLICATIONS

This application claims the benefit of priority to Korean Patent Application No. 10-2023-0013748, filed in the Korean Intellectual Property Office on Feb. 1, 2023, and priority to Korean Patent Application No. 10-2023-0026769, filed in the Korean Intellectual Property Office on Feb. 28, 2023, the entire contents of both of which are incorporated herein by reference.

TECHNICAL FIELD

The present disclosure relates to a laminate for radiative cooling that is transparent and has an excellent cooling effect, and a radiative cooling material including the same.

BACKGROUND

In general, energy consumption is essential for cooling. For example, general-purpose cooling devices such as a refrigerator and an air conditioner compress a refrigerant using energy and then perform the cooling by absorbing heat generated when the compressed refrigerant expands. Radiative cooling is a technology capable of performing the cooling without consuming the energy, unlike the general-purpose cooling device. To improve a radiative cooling efficiency, it is important to well control absorbency, reflectivity, and emissivity of light in each wavelength band. Most of the heat may be generated from incident sunlight and the sunlight may be divided into an ultraviolet (UV) ray, a visible ray, and an infrared ray. When the light of each wavelength band is reflected, inflow of the heat via the sunlight may be blocked. For example, an interior temperature of a black vehicle that absorbs light well rises easily on a sunny day, but a rise of an interior temperature of a white vehicle that reflects light relatively well without absorbing light is relatively slow.

As a material for such radiative cooling, various materials such as a polymer, a multi-layer thin film of inorganic materials or ceramic materials, a material for radiative cooling including a metal reflective layer, a paint containing a white pigment, and the like are used. The polymer material generally has a high absorptivity (emissivity) for the infrared ray, but has a short lifespan because the polymer material is easily deteriorated by the ultraviolet ray, moisture, and the like when left outdoors because of a nature of the material. In a case of the multi-layer thin film, the number of layers must be increased to increase the emissivity for the infrared ray, which increases an absorptivity for the sunlight, so that there is a limit in achieving a high-efficiency radiative cooling performance. In addition, the material including the metal reflective layer is difficult to be applied in real life because of problems of low long-term stability and unit cost caused by oxidation of the metal, and causes eye fatigue and light scattering because of regular reflection of such a metal material. The paint containing the white pigment is not usually composed of a material having a high extinction coefficient, so that there is a problem of insufficient radiative cooling ability because of insufficient infrared emissivity and ultraviolet reflectance.

As an alternative to such problem, Korean Patent No. 2154072 discloses a coolant capable of implementing colors in the radiative cooling containing a first material that emits the infrared ray to cause the radiative cooling, and a second material that absorbs light in a visible ray area, changes a wavelength of the light, and emits the light. However, in Korean Patent No. 2154072, the coolant in which the second material such as a dye or a semiconductor material is mixed with the first material that emits the infrared ray by electromagnetic resonance has a problem of poor radiative cooling ability because of low ultraviolet reflectance.

Therefore, there is a need for research and development on a material that is transparent because of excellent visible transmittance and has excellent radiative cooling ability because of excellent infrared emissivity and near-infrared reflectivity.

SUMMARY

The present disclosure has been made to solve the above-mentioned problems occurring in the prior art while advantages achieved by the prior art are maintained intact.

An aspect of the present disclosure provides a laminate that is transparent because of improved visible transmittance and has improved radiative cooling ability because of improved infrared emissivity and near-infrared reflectivity, and a material for radiative cooling including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a transparent laminate for radiative cooling comprises:

- a first near-infrared reflective layer including a first layer containing a first polymer and a second layer containing a second polymer stacked alternately, wherein the first near-infrared reflective layer reflects a near-infrared ray with a wavelength in a range from 740 to 1,400 nm, wherein the second polymer has lower refractive index than that of the first polymer,
- a second near-infrared reflective layer formed on the first near-infrared reflective layer and reflecting a near-infrared ray with a wavelength in a range from 1,500 to 2,000 nm, and
- an infrared emissive layer formed on the second near-infrared reflective layer and containing polycarbonate.

According to another aspect of the present disclosure, a radiative cooling material comprises the transparent laminate for the radiative cooling.

According to another aspect of the present disclosure, a vehicle contains the radiative cooling material.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Herein, when a component "includes" or "comprises" another component, this means that the former component may further include or comprises other components without excluding other components unless otherwise stated.

Herein, when a member is described to be located on "surface", "top", "one surface", "the other surface" or "both surfaces" of another member, this includes not only a case in which the former member is in contact with the latter member, but also a case in which a third member exists between the two members.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Transparent Laminate for Radiative Cooling

A transparent laminate for radiative cooling according to the present disclosure includes a first near-infrared reflective layer in which a first layer containing a first polymer and a second layer containing a second polymer with lower refractive index than that of the first polymer are alternately stacked, a second near-infrared reflective layer formed on top of the first near-infrared reflective layer, and an infrared emissive layer formed on top of the second near-infrared reflective layer and containing polycarbonate.

Figure 1:
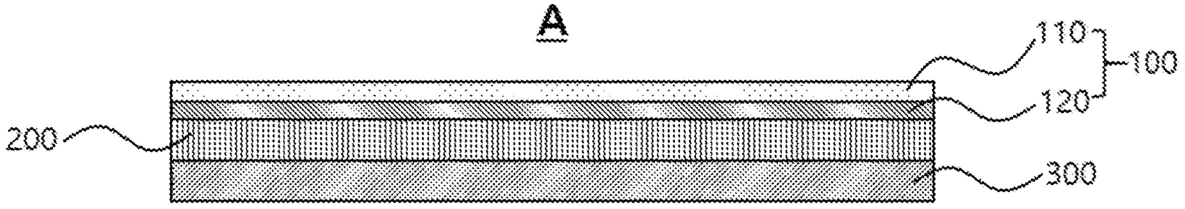
FIG. 1 is a cross-sectional view of a transparent laminate for radiative cooling according to an embodiment of the present disclosure.

Referring to FIG. 1, a laminate 'A' for the radiative cooling according to the present disclosure may have a form in which a first near-infrared reflective layer 100, a second near-infrared reflective layer 200, and an infrared ray emissive layer 300 are stacked in order, and the first near-infrared reflective layer 100 may have a form in which a first layer 110 containing a first polymer and a second layer 120 containing a second polymer are alternately stacked, wherein the second polymer has lower refractive index than that of the first polymer.

First Near-Infrared Reflective Layer

The first near-infrared reflective layer serves to block heat by reflecting a near-infrared ray having a wavelength in a range from 740 to 1,400 nm.

The first near-infrared reflective layer has the form in which the first polymer-containing first layer and the second polymer-containing second layer are alternately stacked, where the second polymer has lower refractive index than that of the first polymer. When the first near-infrared reflective layer has the form in which the first layer and the second layer have lower refractive index than the first layer is alternately stacked, the first layer with a relatively high refractive index and the second layer with a relatively low refractive index are alternately stacked so as to create an interference to change a travel direction of light, thereby effectively blocking the heat.

Specifically, the first near-infrared reflective layer may be formed by alternately stacking 300 to 600 layers, 300 to 400 layers, or 400 to 600 layers of the first layer and the second layer. When the number of alternately stacked layers of the first layer and the second layer is smaller than the above range, a near-infrared reflectance may decrease, and when the number of alternately stacked layers of the first layer and the second layer is greater than the above range, the reflectance may increase at an undesirable wavelength.

For example, the first polymer may comprise at least one selected from a group consisting of polyester, polyethylene (PE), polyvinyl chloride (PVC), polyvinylpyrrolidone (PVP), polystyrene (PS), polyethylenimine (PEI), and polycarbonate (PC). Specifically, the polyester may be the polyethylene terephthalate (PET).

In addition, the first polymer may have a weight-average molecular weight in a range from 40,000 to 55,000 g/mol, or from 50,000 to 55,000 g/mol. When the weight-average molecular weight of the first polymer is smaller than or greater than the above range, the near-infrared reflectance may decrease.

The first layer may have an average thickness in a range from 0.12 to 0.18 μm or from 0.14 to 0.15 μm. When the average thickness of the first layer is smaller than the above range, the near-infrared reflectance may decrease, and when the average thickness of the first layer is greater than the above range, the reflectance may increase at a specific wavelength.

In addition, the first layer may have a refractive index equal to or higher than 1.5, equal to or higher than 1.6, or in a range from 1.6 to 1.8.

For example, the second polymer may comprises at least one selected from a group consisting of polyacrylate, poly (vinyl alcohol) (PVA), polydimethylsiloxane (PDMS), polychlorotrifluoroethylene (PCTFE), polylactic acid (PLA), polymethylpentene (PMP), and cellulose. Specifically, the polyacrylate may include poly(methyl methacrylate) (PMMA).

In addition, the second polymer may have a weight-average molecular weight in a range from 40,000 to 50,000 g/mol, or from 40,000 to 45,000 g/mol. When the weight-average molecular weight of the second polymer is smaller than or greater than the above range, the near-infrared reflectance may decrease.

The second layer may have an average thickness in a range from 0.13 to 0.19 μm, or from 0.15 to 0.16 μm. When the average thickness of the second layer is smaller than the above range, the near-infrared reflectance may decrease, and when the average thickness of the second layer is greater than the above range, the reflectance may increase at the specific wavelength.

In addition, the second layer may have a refractive index equal to or less than 1.5, more than 1.3 and less than 1.5, or more than 1.4 and less than 1.5.

The first near-infrared reflective layer may have an average thickness in a range from 50 to 300 μm or from 75 to 250 μm. When the average thickness of the first near-infrared reflective layer is smaller than the above range, the near-infrared reflectance may decrease, and when the average thickness of the first near-infrared reflective layer is greater than the above range, the reflectance may increase at the undesired wavelength.

First Adhesive Layer

The transparent laminate for the radiative cooling may further include a first adhesive layer between the first near-infrared reflective layer and the second near-infrared reflective layer. In this regard, the first adhesive layer may contain a UV curing adhesive or a moisture curing adhesive.

The UV curable adhesive may be used without particular limitation as long as it is an adhesive that is typically cured by an ultraviolet ray, and may contain, for example, an acrylic monomer and an UV photoinitiator.

The acrylic monomer may be used without particular limitation as long as it is generally applicable to the UV curing adhesive, and may comprise, for example, at least one selected from a group consisting of an alkyl (meth)acrylate monomer and an amide group-containing unsaturated (meth)acrylic monomer.

The alkyl (meth)acrylate monomer may comprise, for example, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth) acrylate, isopentyl (meth)acrylate, 2-methylbutyl (meth) acrylate, n-hexyl (meth)acrylate, 4-methyl-2-pentyl (meth) acrylate, 2-ethylhexyl (meth)acrylate, 2-methylhexyl (meth) acrylate, n-octyl (meth)acrylate, isooctyl (meth)acrylate, 2-octyl (meth)acrylate, isononyl (meth)acrylate, isoamyl (meth)acrylate, n-decyl (meth)acrylate, isodecyl (meth) acrylate, 2-propylheptyl (meth)acrylate, isotridecyl (meth) acrylate, isostearyl (meth)acrylate, octadecyl (meth)acrylate, 2-octyldecyl (meth)acrylate, dodecyl (meth)acrylate, isobornyl (meth) acrylate, lauryl (meth)acrylate, and heptadecanyl (meth)acrylate, but may not be limited thereto.

The amide group-containing unsaturated (meth)acrylic monomer may comprise, for example, (meth)acrylamide; N-alkyl (meth)acrylamide such as N-methyl (meth)acrylamide, N-ethyl (meth)acrylamide, N-isopropyl (meth)acrylamide, N-tert-butyl (meth)acrylamide, N-tert-octyl (meth)acrylamide, or N-octyl (meth)acrylamide; or N-vinyl caprolactam, N-vinyl-2-pyrrolidone, (meth)acryloyl morpholine, and N,N-dialkyl acrylamide. In this regard, the N,N-dialkyl acrylamide may comprise, for example, N,N-dimethyl (meth)acrylamide, N,N-diethyl (meth)acrylamide, N,N-dipropyl (meth)acrylamide, and N,N-dibutyl (meth) acrylamide.

In this regard, "(meth)acrylate" refers to methacrylate and/or acrylate, and "(meth)acryl" refers to acryl and/or methacryl.

The UV photoinitiator may be used without particular limitation as long as it is generally applicable to the UV curing adhesive, and may be, for example, an acyl phosphine oxide-based compound. In this regard, the acyl phosphine oxide-based compound may comprise, for example, ethyl phenyl phosphinate, (2,6-dimethoxybenzoyl)-2,4,4-pentyl phosphine oxide, 2,4,6-trimethylbenzoyldiphenyl phosphine oxide, bis(2,4,6-trimethylbenzoyl)-phenyl phosphine oxide, bis(2,6-dimethoxybenzoyl)-2,4,4-trimethyl-pentyl phosphine oxide, 2-methylbenzoyldiphenyl phosphine oxide, 2,4,6-trimethylbenzoyl phenyl phosphinic acid methyl ester, bis(2,6-dimethoxybenzoyl) phenyl phosphine oxide, ethyl-2,4,6-trimethylbenzoyl phenyl phosphinate, and the like.

The moisture curing adhesive may be used without particular limitation as long as it is an adhesive that is usually cured by moisture in the air, and may be, for example, a polyurethane-based adhesive. In this regard, the polyurethane-based adhesive may contain a urethane-based prepolymer and polyisocyanate.

The urethane-based prepolymer may contain a hydroxyl group and react with the polyisocyanate to cure the adhesive. In addition, the urethane-based prepolymer may be used without particular limitation as long as it is generally applicable to the urethane-based adhesive, and may have, for example, a weight-average molecular weight in a range from 5,500 to 6,500 g/mol, from 5,850 to 6,000 g/mol, or from 6,100 to 6,500 g/mol.

In addition, the polyisocyanate may be used without particular limitation as long as it is generally applicable to the urethane-based adhesive. For example, a content of unreacted isocyanate groups (NCO %) may be in a range from 0.01 to 0.1% by weight, from 0.01 to 0.05% by weight, or from 0.05 to 0.1% by weight.

The first adhesive layer may have an average thickness in a range from 0.2 to 1.0 μm, from 0.2 to 0.75 μm, or from 0.2 to 0.5 μm. When the average thickness of the first adhesive layer is smaller than the above range, a film adhesion may decrease, and when the average thickness of the first adhesive layer is greater than the above range, infrared absorptivity may increase.

Second Near-Infrared Reflective Layer

The second near-infrared reflective layer serves to block the heat by reflecting a near-infrared ray having a wavelength in a range from 1,500 to 2,000 nm.

The second near-infrared reflective layer may contain at least one selected from a group consisting of silver (Ag), gold (Au), carbon (C), and chromium (Cr). Specifically, the second near-infrared reflective layer may contain Ag, Au, C, and Cr. When the second near-infrared reflective layer contains Ag, Au, C, and Cr, the near-infrared reflectance may increase because of a light interference.

In addition, the second near-infrared reflective layer may have an average thickness in a range from 20 to 100 μm or from 50 to 100 μm. When the average thickness of the second near-infrared reflective layer is smaller than the above range, the near-infrared reflectance may decrease, and when the average thickness of the second near-infrared reflective layer is greater that the above range, the reflectance may increase at the undesired wavelength.

Infrared Emissive Layer

The infrared emissive layer serves to emit the heat via emission of an infrared ray.

The infrared emissive layer contains the polycarbonate. Specifically, the infrared emissive layer may be a polycarbonate film.

The polycarbonate may have a weight-average molecular weight in a range from 20,000 to 50,000 g/mol, from 20,000 to 30,000 g/mol, or from 30,000 to 50,000 g/mol. When the weight-average molecular weight of the polycarbonate is smaller than or greater than the above range, a near-infrared emissivity may decrease.

The infrared emissive layer may further contain at least one selected from a group consisting of polyvinyl butyral (PVB), silica ($SiO_2$), acrylic resin, and polydimethylsiloxane (PDMS).

In addition, the infrared emissive layer may have an average thickness in a range from 50 to 250 μm or from 100 to 300 μm. When the average thickness of the infrared emissive layer is smaller than the above range, the infrared emissivity may decrease, and when the average thickness of the infrared emissive layer is greater than the above range, a visible transmittance may decrease.

Second Adhesive Layer

The transparent laminate for the radiative cooling may further comprise a second adhesive layer between the second near-infrared reflective layer and the infrared emissive layer. In this regard, the second adhesive layer may contain the UV curing adhesive or the moisture curing adhesive.

Each of the UV curing adhesive and the moisture curing adhesive is as described for the first adhesive layer.

In addition, the second adhesive layer may have an average thickness in a range from 0.2 to 1.0 μm, from 0.2 to 0.75 μm, or from 0.2 to 0.5 μm. When the average thickness of the second adhesive layer is smaller than the above range, the film adhesion may decrease, and when the average thickness of the second adhesive layer is greater than the above range, the infrared absorptivity may increase.

The transparent laminate for the radiative cooling according to the present disclosure as described above is transparent because of excellent visible transmittance and has excellent radiative cooling ability because of excellent far-infrared emissivity and near-infrared reflectivity. In addition, the laminate for the radiative cooling has excellent emissivity for a wavelength in a range from 8 to 14 μm, which is an atmospheric window, and thus has the excellent radiative cooling ability. Furthermore, the laminate for the radiative cooling has the excellent radiative cooling ability because of low absorption of thermal energy by convection, and thus is able to be suitably used as a material in various fields requiring a material having the excellent radiative cooling ability, such as a vehicle.

Radiative Cooling Material

The radiative cooling material of the present disclosure comprises the transparent laminate for the radiative cooling.

In addition, the radiative cooling material may applied to roof panel or glass for vehicle or building.

As described above, the radiative cooling material comprises the laminate for the radiative cooling that is transparent because of the excellent visible transmittance and has the excellent radiative cooling ability because of the excellent far-infrared emissivity and the near-infrared reflectivity, so that the radiative cooling material may be suitably used as the material in the various fields requiring the material with the excellent radiative cooling ability, such as the vehicle.

Thereafter, the second near-infrared reflective layer (manufacturer: 3M, product name: CR70, thickness: 75 μm) was deposited on the first adhesive layer.

Thereafter, the UV curing adhesive (manufacturer: Top chemical company, product name: SECURE SE-8145, containing the acrylic monomer and the UV photoinitiator [the ethyl phenyl phosphinate]) was applied on the second near-infrared reflective layer to manufacture the second adhesive layer with the average thickness of 0.2 μm.

Thereafter, the infrared emissive layer (manufacturer: Samyang, product name: TRIREX Polycarbonate, thickness: 200 μm) was deposited on the second adhesive layer to manufacture the laminate.

Examples 2 and 3 and Comparative Examples 1 to 3

The laminates were manufactured in the same manner as in Example 1, except that the thickness and a composition of each layer were adjusted as shown in Table 1.

TABLE 1

| | First near-infrared reflective layer | | | First near-infrared | Second near-infrared | First | Infrared |
|---|---|---|---|---|---|---|---|
| | First layer thickness (μm) | Second layer thickness (μm) | Number of layers | reflective layer thickness (μm) | reflective layer thickness (μm) | adhesive layer thickness (μm) | emissive layer thickness (μm) |
| Example 1 | 0.15 | 0.15 | 450 | 135 | 75 | 0.2 | 200 |
| Example 2 | 0.15 | 0.15 | 450 | 135 | 75 | 0.2 | 50 |
| Example 3 | 0.15 | 0.15 | 450 | 135 | 75 | 0.2 | 500 |
| Comparative Example 1 | — | — | — | — | 75 | — | 200 |
| Comparative Example 2 | 0.15 | 0.15 | 450 | 135 | — | 0.2 | 200 |
| Comparative Example 3 | 0.15 | 0.15 | 450 | 135 | 75 | 0.2 | — |

Vehicle or Building

A vehicle or a building of the present disclosure contains the radiative cooling material. As a result, the vehicle and the building are able to save cooling energy in summer and thus have excellent energy efficiency.

Hereinafter, the present disclosure will be described in more detail via Examples. However, such Examples are only for helping understanding of the present disclosure, and the scope of the present disclosure is not limited to such Examples in any sense.

EXAMPLES

Example 1: Manufacture of Laminate

PET Resin (manufacturer: SM chemical, product name: Tex Pet, Mw: 52,000 g/mol) as the first layer and PMMA Resin (manufacturer: LX MMA, product name: HI835MS, Mw: 43,000 g/mol) as the second layer were coextruded such that a thickness of each layer is 0.15 μm and alternately stacked by 450 layers to manufacture the first near-infrared reflective layer with the average thickness of 135 μm.

The UV curing adhesive (manufacturer: Top chemical company, product name: SECURE SE-8145, containing the acrylic monomer and the UV photoinitiator [the ethyl phenyl phosphinate]) was applied on the first near-infrared reflective layer to manufacture the first adhesive layer with the average thickness of 0.2 μm.

Test Example: Evaluation of Characteristics

Physical properties of the laminates of Examples and Comparative Examples were evaluated in a following manner, and results are shown in Table 2.

After mounting an integrating sphere on a Fourier Transform Infrared spectrometer (FT-IR), reflectance and transmittance for a wavelength in a range from 0.2 to 20 μm of the laminates of Examples and Comparative Examples were measured, and then average emissivity was calculated. In this regard, the reflectance and emissivity measurement results of Example 1 are shown in FIG. 2.

TABLE 2

| | Average emissivity for wavelength from 8 to 14 μm | Average reflectance for wavelength from 0.3 to 2 μm |
|---|---|---|
| Example 1 | 90% | 80% |
| Example 2 | 70% | 80% |
| Example 3 | 80% | 80% |
| Comparative Example 1 | 90% | 50% |
| Comparative Example 2 | 90% | 60% |
| Comparative Example 3 | 15% | 80% |

Figure 2:
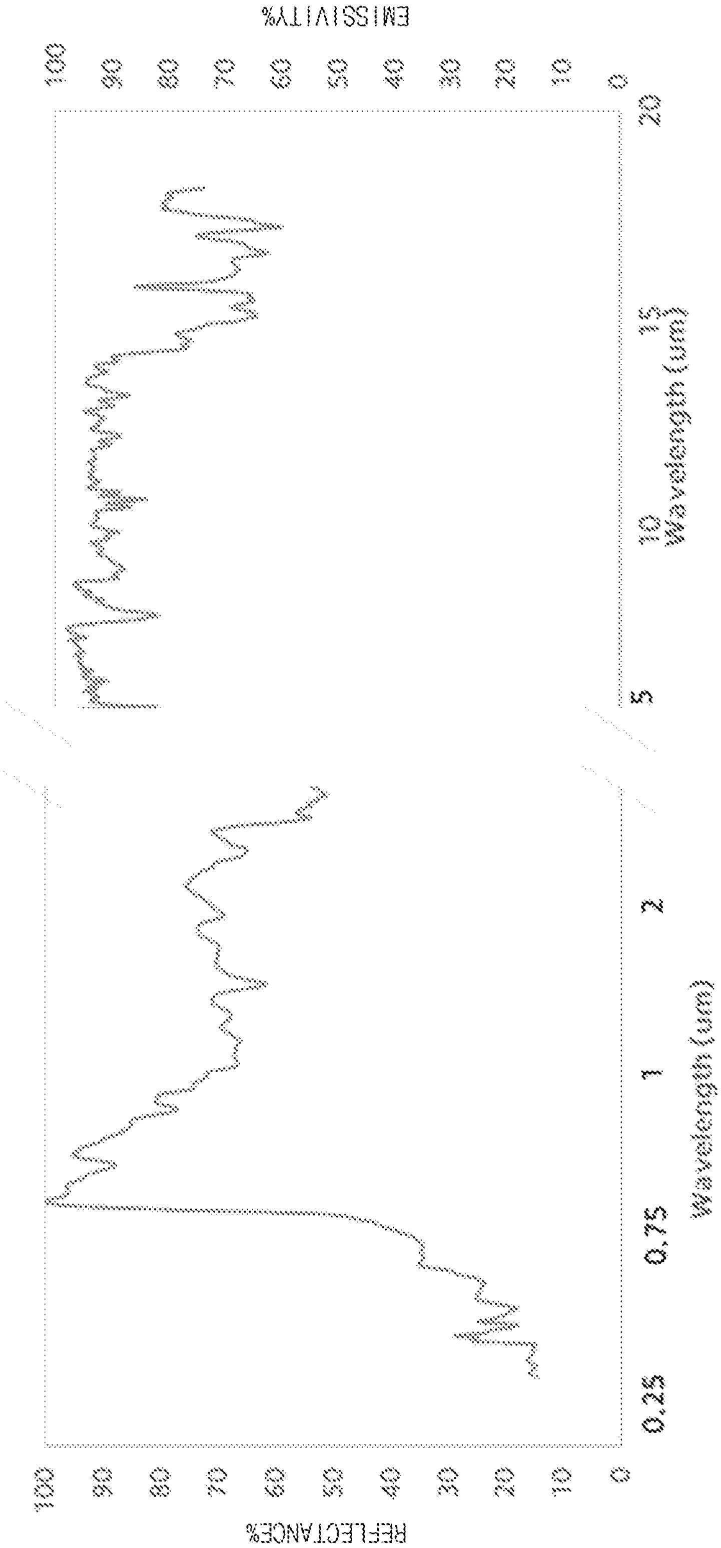
FIG. 2 shows emissivity and reflectance measurement results of a transparent laminate for radiative cooling according to an embodiment of the present disclosure.

As shown in Table 2 and FIG. 2, the laminate of Example 1 has a remarkably high emissivity of 90% for a wavelength in a range from 8 to 14 μm, which is the atmospheric window, and has a high reflectance of 80% for the near-infrared ray of a wavelength in a range from 0.3 to 2 μm, so that the laminate of Example 1 is determined to have the excellent radiative cooling ability.

On the other hand, Comparative Example 1, which does not include the first near-infrared reflective layer, and Comparative Example 2, which does not include the second near-infrared reflective layer and the second adhesive layer, have a low reflectance equal to or lower than 60% for the near-infrared ray of the wavelength in the range from 0.3 to 2 μm.

In addition, Comparative Example 3, which does not include the infrared emissive layer, has a remarkably low emissivity lower than 20% for the wavelength in the range from 8 to 14 μm, which is a far-infrared ray and the atmospheric window.

The transparent laminate for the radiative cooling according to the present disclosure is transparent because of the excellent visible transmittance, and has the excellent radiative cooling ability because of the excellent far-infrared emissivity and the near-infrared reflectivity. In addition, the laminate for the radiative cooling has the excellent emissivity for the wavelength in the range from 8 to 14 μm, which is the atmospheric window, and thus has the excellent radiative cooling ability. Furthermore, the laminate for the radiative cooling has the excellent radiative cooling ability because of the low absorption of the thermal energy by the convection, and thus is able to be suitably used as the material in the various fields requiring the material having the excellent radiative cooling ability, such as the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A transparent laminate for radiative cooling, the transparent laminate comprising:

a first near-infrared reflective layer including a first layer containing a first polymer and a second layer containing a second polymer stacked alternately with the first layer, wherein the first near-infrared reflective layer reflects a near-infrared ray with a wavelength in a range from 740 to 1,400 nm, and wherein the second polymer has lower refractive index than the first polymer;

a second near-infrared reflective layer formed on the first near-infrared reflective layer and reflecting a near-infrared ray with a wavelength in a range from 1,500 to 2,000 nm; and an infrared emissive layer formed on the second near-infrared reflective layer and containing polycarbonate;

wherein the second near-infrared reflective layer contains at least one selected from a group consisting of: Au and C, and wherein the infrared emissive layer has an average thickness in a range from 50 to 300 μm.

2. The transparent laminate of claim 1, wherein the first near-infrared reflective layer comprises an alternating stack of the first layer and the second layer with 300 to 600 layers.

3. The transparent laminate of claim 1, wherein the first polymer comprises at least one selected from a group consisting of: polyester, polyethylene (PE), polyvinyl chloride (PVC), polyvinylpyrrolidone (PVP), polystyrene (PS), polyethylenimine (PEI), and polycarbonate (PC).

4. The transparent laminate of claim 3, the polyester comprises polyethylene terephthalate (PET).

5. The transparent laminate of claim 1, wherein the second polymer comprises at least one selected from a group consisting of: polyacrylate, poly (vinyl alcohol) (PVA), polydimethylsiloxane (PDMS), polychlorotrifluoroethylene (PCTFE), polylactic acid (PLA), polymethylpentene (PMP), and cellulose.

6. The transparent laminate of claim 5, the polyacrylate comprises poly (methyl methacrylate) (PMMA).

7. The transparent laminate of claim 1, wherein the first polymer has a weight-average molecular weight in a range from 40,000 to 55,000 g/mol, and wherein the second polymer has a weight-average molecular weight in a range from 40,000 to 50,000 g/mol.

8. The transparent laminate of claim 1, wherein the first layer has an average thickness in a range from 0.12 to 0.18 μm, and wherein the second layer has an average thickness in a range from 0.13 to 0.19 μm.

9. The transparent laminate of claim 1, wherein the first near-infrared reflective layer has an average thickness in a range from 50 to 300 μm, wherein the second near-infrared reflective layer has an average thickness in a range from 20 to 100 μm, and wherein the infrared emissive layer has an average thickness in a range from 50 to 250 μm.

10. The transparent laminate of claim 1, further comprising:

a first adhesive layer positioned between the first near-infrared reflective layer and the second near-infrared reflective layer, wherein the first adhesive layer contains a UV curing adhesive or a moisture curing adhesive.

11. The transparent laminate of claim 10, wherein the UV curing adhesive contains an acrylic monomer and a UV photoinitiator, and wherein the moisture curing adhesive is a polyurethane-based adhesive.

12. The transparent laminate of claim 10, wherein the first adhesive layer has an average thickness in a range from 0.2 to 1.0 μm.

13. A radiative cooling material comprising the transparent laminate for the radiative cooling of claim 1.

14. A vehicle or a building containing the radiative cooling material of claim 13.

* * * * *